US012793389B2

(12) United States Patent
Ibanez et al.

(10) Patent No.: US 12,793,389 B2
(45) Date of Patent: Nov. 10, 2026

(54) METHOD FOR DETERMINING RESERVOIR ZONES IN ROCK CORES USING ARTIFICIAL INTELLIGENCE

(71) Applicant: PETRÓLEO BRASILEIRO S.A.-PETROBRAS, Rio de Janeiro (BR)

(72) Inventors: Delano Menecucci Ibanez, Rio de Janeiro (BR); Erlanny Maria Alves Cruz, Rio de Janeiro (BR); Carlos Eduardo Andrade Gomes Barreto, Campinas (ES); Dorval Carvalho Dias Filho, Rio de Janeiro (BR)

(73) Assignee: PETRÓLEO BRASILEIRO S.A. - PETROBRAS, Rio de Janeiro (BR)

( * ) Notice: Subject to any disclaimer, the term of this patent is extended or adjusted under 35 U.S.C. 154(b) by 159 days.

(21) Appl. No.: 19/038,927

(22) Filed: Jan. 28, 2025

(65) Prior Publication Data

US 2025/0245967 A1 Jul. 31, 2025

(30) Foreign Application Priority Data

Jan. 29, 2024 (BR) .......................... 1020240017935

(51) Int. Cl.

| | |
|---|---|
| ***G06V 10/764*** | (2022.01) |
| ***G06V 10/143*** | (2022.01) |
| ***G06V 10/26*** | (2022.01) |
| ***G06V 10/28*** | (2022.01) |
| ***G06V 10/30*** | (2022.01) |

(Continued)

(52) U.S. Cl.

CPC .......... *G06V 10/764* (2022.01); *G06V 10/143* (2022.01); *G06V 10/26* (2022.01); *G06V 10/28* (2022.01); *G06V 10/30* (2022.01); *G06V 10/32* (2022.01); *G06V 10/34* (2022.01);

(Continued)

(58) Field of Classification Search

CPC .... G06V 10/764; G06V 10/143; G06V 10/26; G06V 10/28; G06V 10/30; G06V 10/32; G06V 10/34; G06V 10/56; G06V 30/1429; G06V 30/1916

See application file for complete search history.

(56) References Cited

U.S. PATENT DOCUMENTS

| | | | | |
|---|---|---|---|---|
| 10,410,092 | B1 * | 9/2019 | Chen | G06V 10/764 |
| 2022/0237891 | A1 * | 7/2022 | Xu | G06V 10/507 |
| 2023/0145880 | A1 * | 5/2023 | Solum | G06F 18/2431<br>382/173 |

FOREIGN PATENT DOCUMENTS

| | | | |
|---|---|---|---|
| RU | 2760105 | C1 | 11/2021 |
| WO | 2022/216298 | A1 | 10/2022 |

OTHER PUBLICATIONS

Worthington et al., The Role of Cutoffs in Integrated Reservoir Studies. SPE Res Eval & Eng. 8(4):276-290.

* cited by examiner

*Primary Examiner* — Wassim Mahrouka
(74) *Attorney, Agent, or Firm* — McCarter & English, LLP; Wei Song

(57) ABSTRACT

The invention comprises a method for a fast, accurate and automatic determination of reservoir and non-reservoir zones of rock cores. The method involves performing pre-processing on images taken under visible light, UV light and tomography of rock cores to extract metadata therefrom and prepare them to be analyzed by a trained artificial intelligence (AI). AI performs an analysis by pixel and by row to determine reservoir and non-reservoir zones. The method (Continued)

further comprises filtering the AI results to reclassify relatively small regions.

3 Claims, 5 Drawing Sheets

(51) Int. Cl.
*G06V 10/32* (2022.01)
*G06V 10/34* (2022.01)
*G06V 10/56* (2022.01)
*G06V 30/14* (2022.01)
*G06V 30/19* (2022.01)

(52) U.S. Cl.
CPC .......... *G06V 10/56* (2022.01); *G06V 30/1429* (2022.01); *G06V 30/1916* (2022.01)

METHOD FOR DETERMINING RESERVOIR ZONES IN ROCK CORES USING ARTIFICIAL INTELLIGENCE

FIELD OF THE INVENTION

The present invention falls within the field of oil engineering. More specifically, the present invention relates to methods for analyzing different types of images (visible light, ultraviolet and tomography) of rock cores to determine oil-bearing and non-oil-bearing zones using artificial intelligence (AI) techniques for image classification. In the present invention, for simplicity, the oil-bearing zones will be referred to as reservoir zones (R) and the non-oil-bearing zones as non-reservoir zones (NR).

BACKGROUND OF THE INVENTION

Determining oil reservoir zones from the evaluation of rock core images is a basic activity in every evaluation of reservoirs. The goal is to map the reservoir zones along the entire length of the well where rock cores were recovered. Such an assessment is essential in estimating the amount of oil present in the reservoir. The challenge is to interpret different types of images, such as visible and ultraviolet light images and tomography images, to determine whether the rock has characteristics to allow viable exploration to characterize these zones. The variety of colors and associations that can exist between the different types of light due to the presence of oil and the mineralogical complexity of the reservoir rocks requires a detailed approach to avoid errors in determining reservoir zones. Such an interpretation is usually done manually and visually by specialist geologists, who assess each image one by one. This process is time consuming, taking weeks or even months, and is susceptible to human perception.

Therefore, there is a need to optimize, standardize and reduce the interpreter's subjectivity in the process of analyzing rock core images.

STATE OF THE ART

Document WO2022216298A1, entitled "Automatic digital rock segmentation", discloses systems and methods automatic digital rock segmentation. A deep learning model may be trained to segment images of reservoir rock. It is worth noting that the reservoir rocks referred to in document WO2022216298A1 do not necessarily contain oil. First, training may involve the use of image data of reservoir rock samples with segmentation data mapping from the intensity of image elements. The result will represent output channels with a characterization of the reservoir rock. Later, the training data can be used to determine the intensity of a second group of images. This trained deep learning model may generate second segmentation data that maps the intensity of each image element in the second image data to a corresponding one of the plurality of output channels. The trained deep learning model can produce a characterization of the new reservoir rock sample based on data from the second segmentation.

Document RU2760105C1, entitled "System, machine-readable media and method for core analysis by images", discloses a method for computer processing and description of the core image. In the method, a core image is obtained in daylight (DL) and ultraviolet (UV) light; solid segments are determined on the core image in daylight (DL) using the watershed method based on the specified segmentation settings; a vector of rock category features is formed for each previously defined image segment; the formed vectors of rock category features are transferred to a multiclass classifier of rocks (MC1), made with the ability to determine at least the following rocks: sandstone, siltstone, mudstone; the areas of luminescence on UV images of the core are determined; vectors of signs of oil saturation and carbonate content are formed for each specific area of luminescence; the formed vectors of signs of oil saturation and carbonate content are transferred to a multiclass classifier (MC2), made with the ability to determine oil saturation and carbonate content; the area of destruction of the DL image is determined and analytical conclusions about the degree of destruction are formed; a description of the core images is formed based on the results of determining the category of rock segments, determining the oil saturation and carbonate content of the glow areas in UV and analytical conclusions about the degree of destruction. As a result: increased accuracy of the core description from the images.

Typically, net pay is defined from cutoff limits of petrophysical properties such as free-fluid porosity, effective porosity, and total porosity. However, there are no standard definitions in the oil industry on how to estimate these limits. Worthington & Cosentino (Worthington, P. F. & Cosentino, L.—2005—The Role of Cutoffs in Integrated Reservoir Studies-SPE Reservoir Evaluation & Engineering, 8(4), p. 276-290), for example, identified several protocols to estimate these limits.

SUMMARY OF THE INVENTION

The main steps of the method of the invention are: (1) recognizing text and information, (2) identifying the region of interest in the images, eliminating foam and box areas where the core is conditioned, (3) aligning, concatenating and organizing images, (4) recognizing rock patterns with the possibility of choosing size parameters (indication of minimum layer size and minimum thickness of the useful area of the core that will be used for analysis), (5) machine learning to associate images with characteristics of oil reservoirs, and (6) generating binarized (reservoirs/non-reservoir) outputs in the format of figures and tables.

BRIEF DESCRIPTION OF THE DRAWINGS

The present invention will now be described with reference to typical embodiments thereof and also with reference to the attached drawings, in which:

FIG. 4A shows the reclassification from the method of row majority voting. FIG. 4B exemplifies isolated pixel reclassification. FIG. 4C exemplifies the reclassification of pixel rows considering a minimum interval of rows pre-defined by the user.

DETAILED DESCRIPTION OF THE INVENTION

Specific embodiments of this disclosure are described below. In an effort to provide a concise description of these embodiments, all features of an actual implementation may not be described in the specification. It should be appreciated that in the development of any actual implementation, as in any engineering or design project, numerous implementation-specific decisions must be made to achieve the specific objectives of the developers, such as compliance with system- and business-related constraints, which may vary from one implementation to another. Furthermore, it should be appreciated that such a development effort may be complex and time-consuming but would nevertheless be a routine design and manufacturing undertaking for those of ordinary skill having the benefit of this disclosure.

Determining reservoir and non-reservoir regions in wellbores is essential for determining net pay. Net pay is a key parameter in the assessment of reservoirs as it identifies the geological sections that have reservoir quality, thus indicating the amount of hydrocarbons sufficient to function as commercial production intervals. Net pay contributes to the estimation of a significant volume of hydrocarbon at the site, being a key parameter for estimating the final recovery. Furthermore, it facilitates reservoir simulation since non-reservoir rocks do not need to be characterized in the same way as reservoir rocks.

Therefore, the machine learning classification process of reservoir zones using rock core images can speed up and standardize this method.

The present invention solves the deficiencies of the state of the art.

The first aspect of the present invention comprises a method for determining reservoir and non-reservoir zones in rock cores using artificial intelligence. The artificial intelligence according to the present invention is trained to recognize patterns in rock images and associate these patterns with the existence of oil-bearing reservoirs.

Figure 1A:
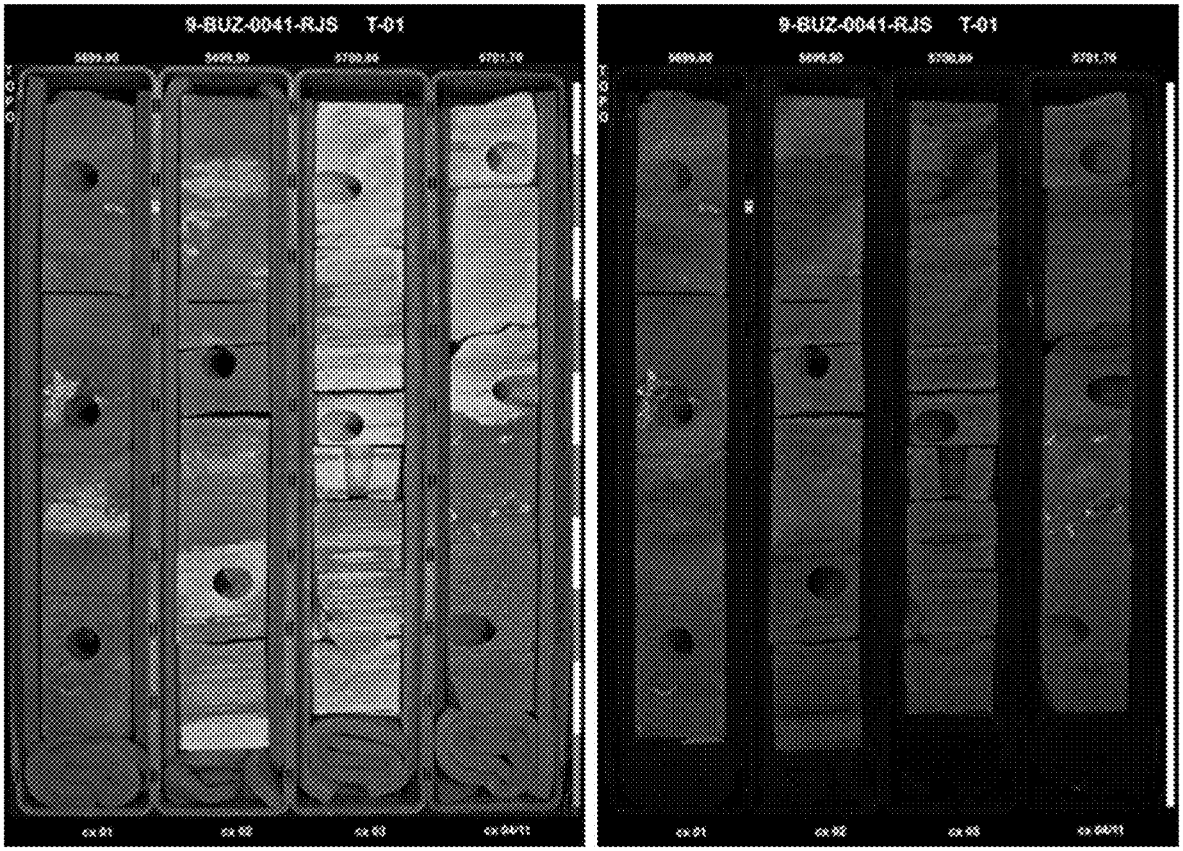
FIG. 1A is a representation of visible light and UV light images of rock cores in their storage boxes.
Figure 1B:
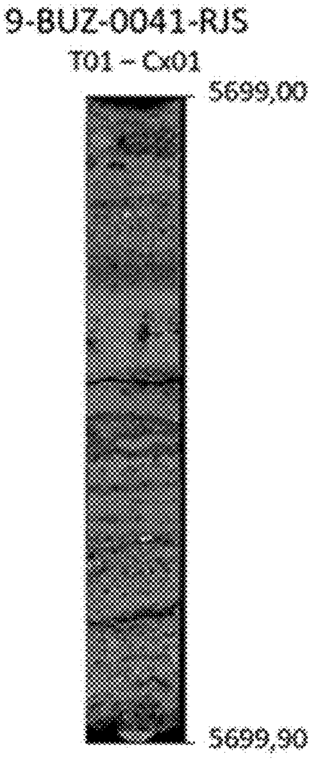
FIG. 1B is a representation of a tomography image of a rock core.

First, three types of images are obtained from rock cores: images under visible light, images under ultraviolet (UV) light and tomography images, as exemplified in FIG. 1A and FIG. 1B.

FIG. 1A represents the rock cores photographed under visible light and UV light in the storage boxes together with the foam in the lower part that fills the boxes to prevent the cores from moving during shipping. There is also a lot of information about the cores, which will be useful for their automated identification and organization, as seen below. For example, the numbers at the top of each box in FIG. 1A (5699.00; 5699.90; 5700.80; 5101.70) represent the depth in meters at which these cores were taken, the captions at the bottom of each box in FIG. 1A (cx1, cx2, cx3, cx4/11), and the caption at the top of FIG. 1A identifies the oil field from where the cores were taken. Further caption and data type configurations are possible without departing from the scope of the invention.

FIG. 1B represents the tomography images of each individual core. Only the core itself undergoes tomography, so the other elements, such as the box and foam, are absent.

The images in FIG. 1A can be obtained through high-resolution photographs, which is common practice in the art. Thereafter, the images must undergo treatment to eliminate features that are not part of the rock cores per se, such as texts, storage boxes and foam, to facilitate the rock core analysis process. This treatment can be carried out manually, but preferably it is performed automatically.

Therefore, according to the present invention, the images under visible light and under UV light exemplified in FIG. 1A are preferably processed to extract identification information from the boxes and cores and to obtain an image containing solely the cores and containing metadata to identify these cores. The following processes are performed for each image under visible light and under UV light:

1) Pre-processing:

1.1) A thresholding process is carried out to detect elements of a certain color. In particular, the textual elements of the image will be identified. In the case of FIG. 1A, this color would be white.

1.2) Opening and closing operations are performed to eliminate noise and detect horizontal rows in the images;

1.3) Dilation operation is performed to increase the area around the identified texts, in order to assist the OCR to follow.

2) OCR: Scanning images to identify the text present in each part of the image.

3) Parser:

3.1) Validation if the amount of text found corresponds to what is expected for each core image according to the length and depth of each box;

3.2) Categorization and organization of text according to data identified from the text, such as reservoir name, depth and number of the storage box.

The identified text and data are converted into metadata and added to the images under visible light and UV light, including the type of light used to obtain each image. Accordingly, each image receives a unique set of metadata, being able to be uniquely identified and allowing the identification of corresponding images of the same rock core under visible and UV light.

Next, the method identifies the image features. Each image has, in addition to the rock core, the storage box, texts and foam. To recognize these features, image segmentation procedures are performed. Segmentations are preferably performed on images under UV light as they offer greater ease for this and segmentation can be copied to the corresponding image under visible light. Segmentation follows the following order of steps:

4) Applying a Threshold and morphological operations to divide the image into three regions: top, middle and bottom. The top and bottom regions are those that contain the texts identified during the OCR stage, and the middle region contains the rest of the images, in this instance, the rock core, the box and the foam;

5) Segmenting the middle region, segmenting the areas containing the rock core, the foam and the box. Preferably the Otsu multithreshold method is used and, also preferably, it is performed in the image under UV light.

6) Noise removal by filling “holes” in the image and eliminating regions with isolated pixels.

Steps 4, 5, and 6 above result in the generation of a mask for each image, which uniquely returns the rock core of the image in question. This mask is also applied to the corresponding image under visible or UV light, so there is no need to repeat the above steps for the corresponding image.

Application of the obtained mask produces processed images, which will be considered for the following steps of the method of the present invention.

Next, the tomography images are also processed, which is different from the others, and all corresponding images are concatenated and ordered:

7) Resizing each tomography image to fit the vertical size of the processed visible and UV light images.

8) Vertical concatenation of the corresponding images, connecting the horizontal centroids of each image following the numbering of the boxes obtained in steps 2 and 3.

Figure 2:
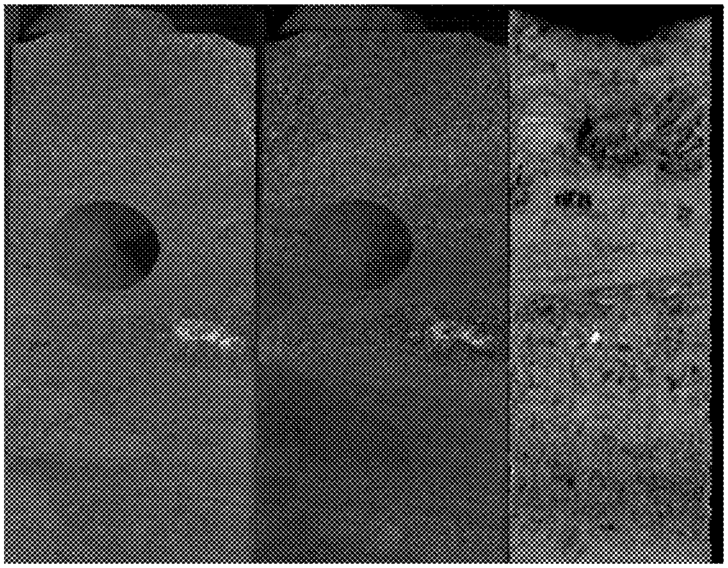
FIG. 2 is a representation of visible light, UV light and tomography images aligned in accordance with the present invention.

Tomography images are now presented only with the rock core, so they do not need to go through steps 4, 5 and 6. The metadata in each image allows the identification of the corresponding images and their concatenation. The concatenated images are ordered according to one or more of the box numbers, depth, oil field, or any other metadata. FIG. 2 illustrates the result of steps 1 to 8 disclosed above showing, from left to right, the image under visible light, under UV light and tomography of a rock core.

Steps 1 to 8 disclosed above describe a pre-processing of the images and can be performed by already known processing techniques, so that the invention is not limited to any particular image processing technique. The person skilled in the art will be able to choose the most suitable image processing technique for specific applications without, however, departing from the scope of the present invention.

Steps 1 through 8 above are preferred but not essential for the present invention to be practiced. In fact, the object of the present invention lies in the processing steps of the concatenated images that will determine the presence of oil in rock cores, the classification of the reservoir R and non-reservoir NR regions, and the net pay calculation.

Therefore, according to the present invention, all images are scanned separately, with specific filters for each type of radiation source (FIG. 2). These images taken under different light conditions are aligned to allow a comparison to be made between them. For each type of light, the images are also concatenated and go through two distinct classification steps: the first by pixels and the second by row scanning. Both classifications are based on the hues of the images. In the UV image, the bluish tones are considered, while in the visible and tomographic images, the variation in gray tones is considered, that is, light and dark gray.

First, a filter is applied, for example, a Gaussian filter, to eliminate colors that are considered noise. Evidently, the colors considered as noise can be different between images under visible light, UV and tomography. Then, based on the filtered image, the classifications are reassessed.

9) Pixel classification:

9.1) Incorporation of color information from adjacent pixels into each pixel of the image. Incorporation of information is carried out by simply creating a new variable associated with the pixel. By reading the pixel information and the information from adjacent pixels, it is possible to check whether some pixel configurations exist that can show any relevant information.

9.2) Each pixel is analyzed individually and subjected to classification into one of two groups, based on colors, using the Kmeans method, which performs a separation where the closest colors are grouped into the same group. In summary, in this step the pixels are individually ranked into two groups to later be analyzed in regions (pixel assembly) for R or NR classification.

The result of the previous step goes through a filter to reclassify isolated pixels and those surrounded by pixels of the opposite classification.

9.3) The result of the color classification is assessed by a previously trained artificial intelligence (AI) based on binary images, that is, images already treated by the Gaussian filter, and with the groups manually classified by experts as an indication of reservoir and non-reservoir. Basically, AI recognizes the colors/brightness intensities in binary images to classify them in regions (pixel assembly) into reservoir (R) and non-reservoir (NR).

9.4) In the color analysis, certain shades will be indicative of the presence of oil, pores, and so on. For example, blue-toned colors in the UV light image indicate the presence of oil and should belong to the same group. The color classification result is performed for all types of images and indicators of the presence of reservoir (R) or non-reservoir (NR) are generated. The final classification will then be the result of a comparison in which the indication of the existence of a reservoir under UV light needs to be confirmed by the presence of colors indicative of a reservoir in other types of light. The end result is an image sorted into groups and recorded on a storage media.

As an example of the process of analyzing the combination of image types, bluish tones in UV images can also be caused by other processes, for example, mineral fluorescence and the presence of drilling fluid in the cores. Some types of rock, particularly carbonate rocks, have minerals that can fluoresce and therefore create bluish hues in UV images. Shades of these minerals are confused with the oil shade in these images. Moreover, oil-based fluids can penetrate into the rock core during the drilling process and create bluish halos in UV images, making it difficult to distinguish oil-bearing reservoir zones. All these effects must be identified using the combined color pattern of the different image types.

Therefore, visible light and tomographic imaging should also be used to assess both the halo associated with drilling fluid and mineral fluorescence. Halos are more easily discriminated against in visible light images, where darker shades will be present mainly at the edges of the cores. Mineral fluorescence is minimized using tomographic images, where darker shades of gray indicate more porous zones that could be classified as an oil-bearing reservoir when the UV image is combined with the white light and tomography images.

AI training is performed for each type of image, and each type of color, along with other geological information, will be considered to generate the R or NR indication information. To this end, a robust dataset must be used in training so that the association of colors with a reservoir in certain rock types is carried out successfully.

The AI in step 9.3 is trained using a database comprising pixel images manually classified by those skilled in the art. Any AI and any training method can be used. For example, and without limitation, a support vector machine can be used. The result of AI classification is an image classified into R and NR regions.

AI classification can cause very small regions to exist surrounded by a larger region of opposite classification. For example, there may be a relatively small region classified as R surrounded by a much larger number of pixels classified as NR. Therefore, step 9.4 applies a filter that reclassifies these relatively small regions in line with the relatively large regions surrounding them.

This step is intended to improve the accuracy of pixel classification by applying a filter that searches for isolated pixels that will be disregarded in a region where there is a prevalence of pixels that indicate another classification. For example, an isolated NR pixel may be surrounded by R pixels. Thus, this filtering is used to remove small islands of foreign pixels, by replacing them with values corresponding to their surroundings.

The sensitivity of this filter is selected by the user and can be more or less sensitive depending on specific applications. For example, an increased sensitivity may cause relatively small regions of pixels that would not have been reclassified before to be reclassified according to a relatively large, oppositely classified region surrounding them.

Step 9.4 is based on practice, where relatively small NR areas surrounded by relatively large R areas do not represent an impediment to oil extraction, and, in the opposite scenario, relatively small R areas are not advantageous for extraction.

Filters, such as the Gaussian filter, other image processing techniques and AI training techniques and application of a trained AI are known features in the state of the art, so they will not be comprehensively detailed here. The invention is not limited to any particular software or device and can be achieved by any means that the user deems convenient, without departing from the scope of the invention.

10) Classification by horizontal region:

10.1) Classification of each pixel of each row of pixels using the same AI as in step 9.3.

10.2) Harmonization of the classification of all pixels in each row of pixels according to a majority voting method for each pixel, forming R and NR regions.

10.3) Grouping of adjacent rows of the same classification, forming R and NR regions.

10.4) Reclassification of relatively small regions surrounded by relatively large regions of opposite classification.

Figure 4A:
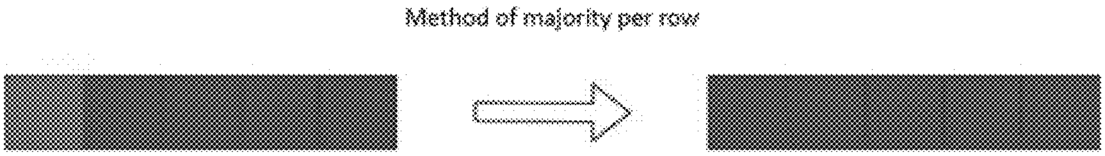
FIGS. 4A, 4B and 4C are representations of pixel reclassification according to the present invention.
Figure 4B:
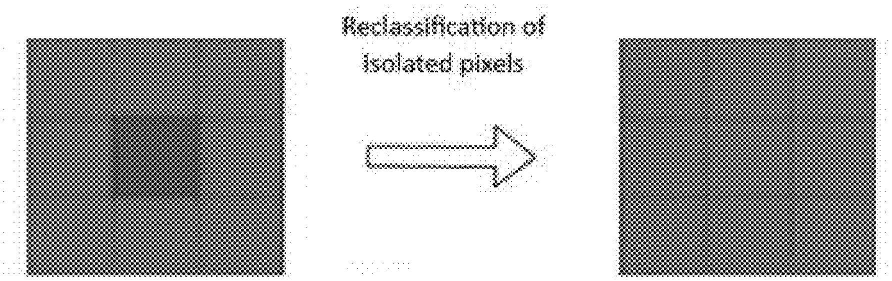
Figure 4C:
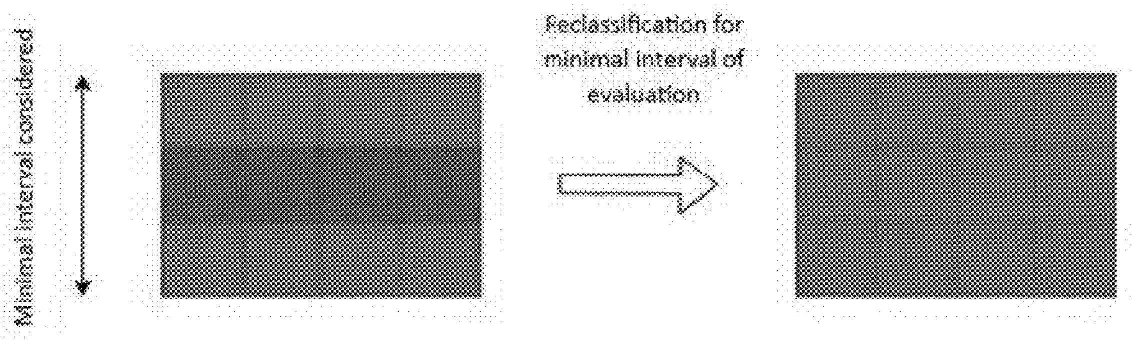

Classifying pixels using the majority voting method results in entire rows being classified as either R or NR in step 10.2. Similar to step 9.4, in step 10.4 relatively small regions surrounded (in this case only from above and below rather than from all directions) by relatively large regions of opposite classification are reclassified according to the user-defined sensitivity (FIGS. 4A, 4B and 4C). For example, a minimum interval can be defined in centimeters or pixels to reclassify relatively small regions (FIG. 4C). Any region with a vertical length of less than 40 cm may be reclassified if there is an oppositely classified region above it and below it, each at least 40 cm in vertical length.

Figure 5:
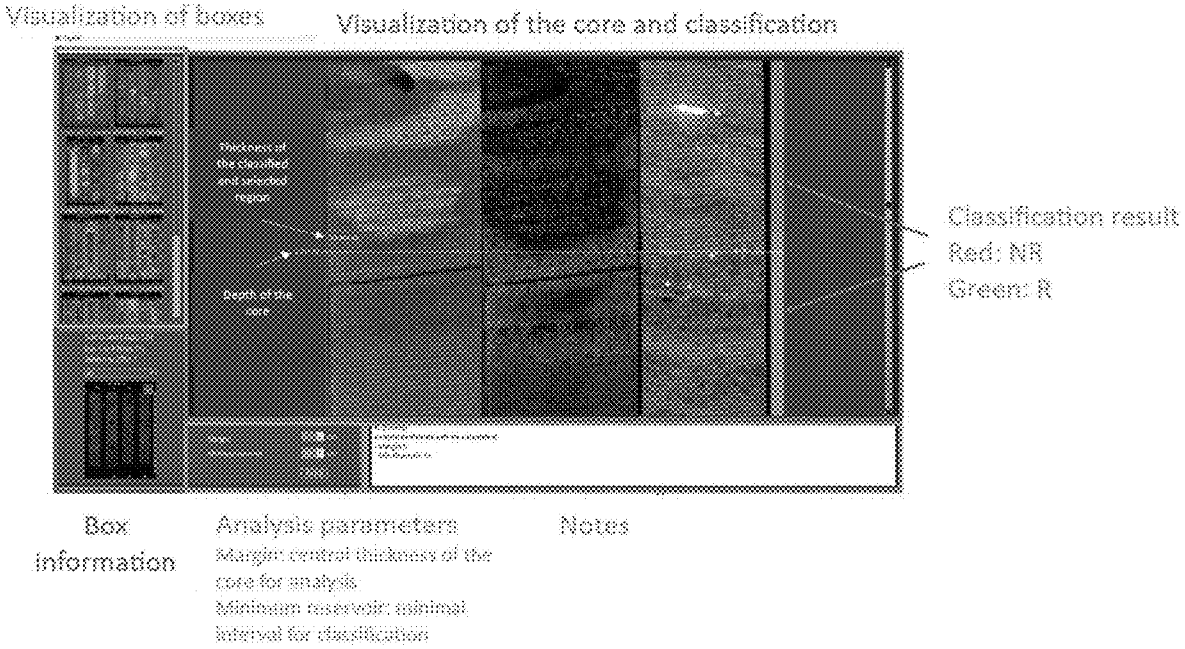
FIG. 5 is an illustrative representation of the result of the method of the present invention.
Figure 6:
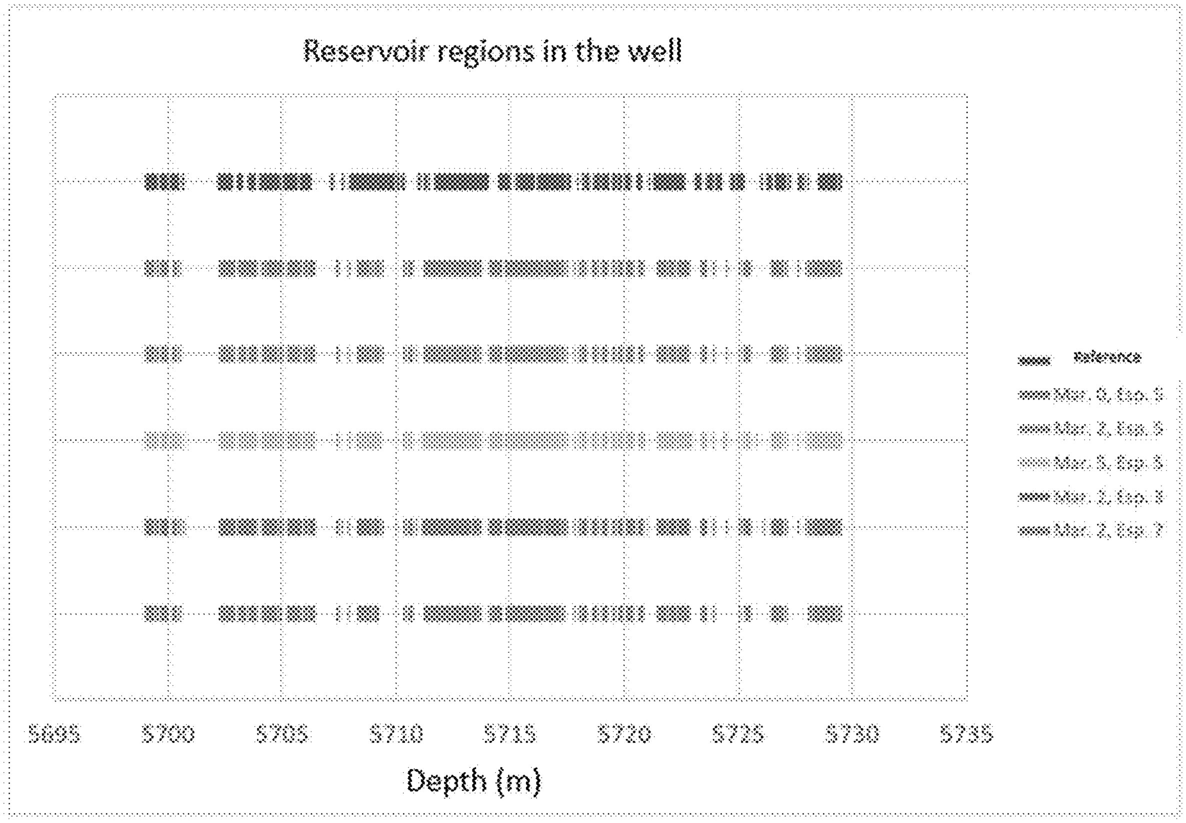
FIG. 6 is a graph comparing the results obtained by artificial intelligence compared to the reference obtained by geologists.

After classifying each image by pixels and by row under visible light, UV light and tomography, it is possible to obtain a binary image in which the rock core is divided into regions classified as R or NR (FIG. 5).

The software and devices capable of performing the steps defined above are, again, well known in the art, and it is up to the user to choose those that best suit practical applications. The present invention is not limited to any particular device or software, being defined solely by the above steps and objectives.

11) Data organization:

11.1) The binary images containing the classified regions receive the extracted metadata obtained in steps 3.1 and 3.2.

11.2) Generating binary output images containing the concatenated classified images.

The binary images containing the regions receive metadata containing the box number, depth, reservoir name and any other metadata extracted at the beginning of the method to calculate the thickness of the classified area intervals. Then, images are created identifying which region has reservoir and non-reservoir characteristics, with the structure of FIG. 5, with the difference of having metadata that allows their automated location and identification. Tables are also generated, as exemplified in table 1, which relate the depth of the rock and the presence of reservoirs.

Figure 3:
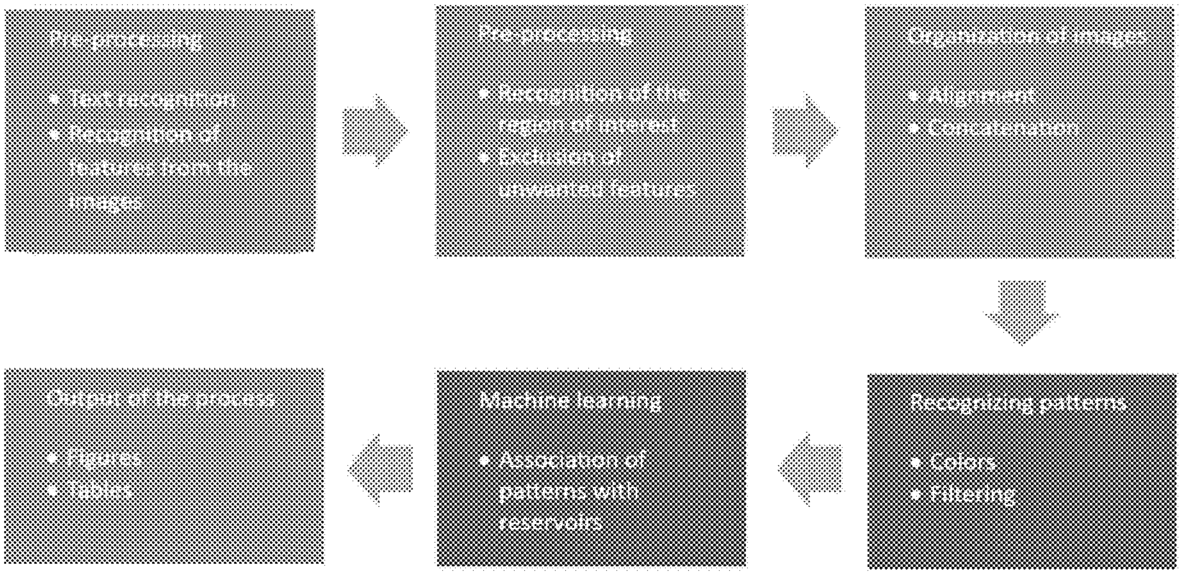
FIG. 3 is a flowchart representing the main steps and the auxiliary steps of the method of the present invention.

The method according to steps 1 to 11 is summarized in FIG. 3.

According to the steps described above, a method is achieved that is capable of classifying rock cores into reservoir (R) and non-reservoir (NR) regions in an automated, fast and highly accurate manner. Additionally, it is possible to automatically obtain metadata from rock core images and aggregate this metadata into the final binary images, providing an accurate and complete mapping of the analyzed well.

These procedures take weeks or months to be carried out manually by professionals, but are accomplished in a matter of hours by the method of the present invention.

Therefore, the present invention is advantageous for obtaining a precise and complete result within a time length much shorter than that of the prior art methods, which greatly improves efficiency of the operation, in addition to saving many hours of work for professionals, who will be able to dedicate their time to other activities.

In validation tests, after automatic pre-processing of the images, it was verified that all texts in the images were read successfully. More than 95% of unwanted materials, such as foam and metal boxes, were removed, 50% of the images did not have any type of unwanted material and there was no loss of rock in the process. Therefore, pre-processing was considered a success, with little manual work remaining to be done to remove unwanted material. Additionally, the core images were automatically aligned and arranged side by side.

To apply the classification steps, a well, Well 01, was used to perform AI training and a well, Well 02, to perform application of the trained AI. Both wells had responses previously obtained by geologists and were the reference for training and validating the responses of the AI application.

Tests were carried out with different values for the parameters of disregarded vertical margin of the core and minimum analysis interval, with the tests being carried out with combinations of values of 0 cm, 2 cm and 5 cm of disregarded margin and 3 cm, 5 cm and 7 cm of minimum analysis interval. The discarded margin refers to the thickness of the core that the user wants to classify. For example, if the user indicates 3 cm, classification will be made disregarding 1.5 cm on each side of the core. The minimum interval refers to the final length of the area that will be considered in the classification. For example, if the user indicates 3 cm, only regions with at least 3 cm are considered. Regions with values lower than 3 cm are grouped according to adjacent regions (FIG. 5).

Table 1 shows the results obtained by applying the trained AI on the cores taken from Well 02. The bar at the top of the graph shows the reservoir regions identified by the professionals and the bars below the regions identified by the AI, in relation to the depth at which the sample was in the reservoir.

It can be noted that there is a correspondence between the regions that have oil, which can be designated as clusters, which shows that in general, the AI was able to identify the main regions of the reservoir that have oil, even considering different parameters in the analysis.

In table 2 below, we can see the main indicators for comparison between the results obtained by geologists and AI. We note that the calculated total oil thickness is similar, ranging from an error of 6.55% to −1.79%. In terms of linear amount of reservoirs, the result was consistent with those obtained. However, if we consider only the regions that were identified as reservoir "R" by the geologist, we notice that the error is greater, with the success rate being 82.41% to 95.53%. This shows that automatic color-based evaluation of images using AI alone may not be sufficient to assess the cores considering the level of training used in the test. Taking into account that the AI training database in validation was relatively small, larger training databases, involving a greater number of wells, are expected to result in even greater accuracies. It is also possible to consider other parameters of rock cores to integrate the evaluation process.

TABLE 1

Classification result indicating the top and bottom of each region.

| Well name | Core | Top | Bottom | R/NR |
|---|---|---|---|---|
| 9-BUZ-0041-RJS | T-01 | 5699 | 5699.55 | R |
| 9-BUZ-0041-RJS | T-01 | 5699.55 | 5699.609 | NP |
| 9-BUZ-0041-RJS | T-01 | 5699.609 | 5699.986 | R |
| 9-BUZ-0041-RJS | T-01 | 5699.689 | 5700.066 | NP |
| 9-BUZ-0041-RJS | T-01 | 5700.066 | 5700.393 | R |
| 9-BUZ-0041-RJS | T-01 | 5700.393 | 5700.422 | NP |
| 9-BUZ-0041-RJS | T-01 | 5700.422 | 5700.515 | R |
| 9-BUZ-0041-RJS | T-01 | 5700.515 | 5700.622 | NP |
| 9-BUZ-0041-RJS | T-01 | 5700.622 | 5700.676 | R |
| 9-BUZ-0041-RJS | T-01 | 5700.676 | 5702.115 | NP |
| 9-BUZ-0041-RJS | T-01 | 5702.115 | 5702.783 | R |
| 9-BUZ-0041-RJS | T-01 | 5702.783 | 5702.893 | NP |
| 9-BUZ-0041-RJS | T-01 | 5702.893 | 5703.736 | R |
| 9-BUZ-0041-RJS | T-01 | 5703.736 | 5703.903 | NP |

TABLE 2

Result for indicators of hits in the reservoir region analysis.

| | Geologist | Mar. 0, Esp. 5 | Mar. 2, Esp. 5 | Mar. 5, Esp. 5 | Mar. 2, Esp. 3 | Mar. 2, Esp. 7 |
|---|---|---|---|---|---|---|
| Total thickness of "R" | 5.59 m | 5.55 m | 5.65 | 5.89 m | 5.65 | 5.73 m |
| Error in total thickness of "R" | — | −1% | 1% | 5% | 1% | 2% |
| Hit of "R" regions | — | 82% | 83% | 95% | 83% | 84% |

Although aspects of the present disclosure may be susceptible to various modifications and alternate forms, specific embodiments have been shown by way of example in the drawings and have been described in detail herein. It should be understood that the invention is not intended to be limited to the particular forms disclosed herein. Instead, the invention must cover all modifications, equivalents and alternatives that fall within the scope of the invention as defined by the following appended claims.

The invention claimed is:

1. A method for determining reservoir zones in rock cores using artificial intelligence, wherein the method comprises the steps of:
- providing images under visible light, UV light and tomography images of a rock core;
- applying a filter to eliminate colors that are considered noise, generating a filtered image;
- performing a classification by pixels of the filtered image, comprising:
  - incorporating color information from adjacent pixels into each pixel of each image;
  - analyzing and classify each pixel individually based on its color using the Kmeans method, obtaining an image classified into groups;
  - analyzing the image classified into groups using an artificial intelligence (AI) previously trained to classify each pixel of the image classified into groups as being reservoir (R) or non-reservoir (NR), generating an image classified into regions; and
  - filtering the image classified into regions to reclassify isolated pixels;
- performing a row-by-row classification of the filtered image, comprising:
  - classifying each pixel of each row of pixels using the same AI as the step of analyzing the image classified into groups;
  - harmonizing the classification of all pixels in each row of pixels according to a majority voting method for each pixel, forming R and NR regions;
  - grouping adjacent rows of the same classification, forming R and NR regions; and
  - reclassifying relatively small regions surrounded by relatively large regions of opposite classification;
  - obtaining a binary image with regions classified as R or NR.

2. The method according to claim 1, wherein the method further includes the steps of:
- adding metadata to the binary image; and
- generating a binary output image.

3. The method according to claim 1, wherein providing images under visible light, UV light and tomography images of a rock core comprises the steps of:
- performing a pre-processing on images under visible light and UV light of a rock core, comprising:
  - performing a thresholding process to detect elements of a certain color;
  - performing opening and closing operations to eliminate noise and detect horizontal rows in images;
  - performing a dilation operation to increase the area surrounding detected elements of a certain color;
- performing OCR to identify text present in each part of the images under visible light and UV light;
- performing a parsing, the parsing comprising:
  - validation of whether the amount of text found in the OCR corresponds to an expected amount for each image under visible light and under UV light;
  - ranking and organizing the text according to data identified from the text; and:
- 1—applying a Threshold and morphological operations to divide the images under UV light into a top region, a middle region and a bottom region;
- 2—segmenting the middle region by segmenting areas containing rock core, foam and storage box;
- 3—removing noise from UV light images;
- generating a mask based on at least in part and applying the mask to the visible light and UV light images, obtaining processed visible light and UV light images;
- resizing each tomography image to fit the vertical size of the processed visible and light UV light images; and
- vertically concatenating visible light, UV light and tomography images.

* * * * *